Robert Weare's
Improvement in Treating Sewage, &c.
116515
PATENTED JUN 27 1871
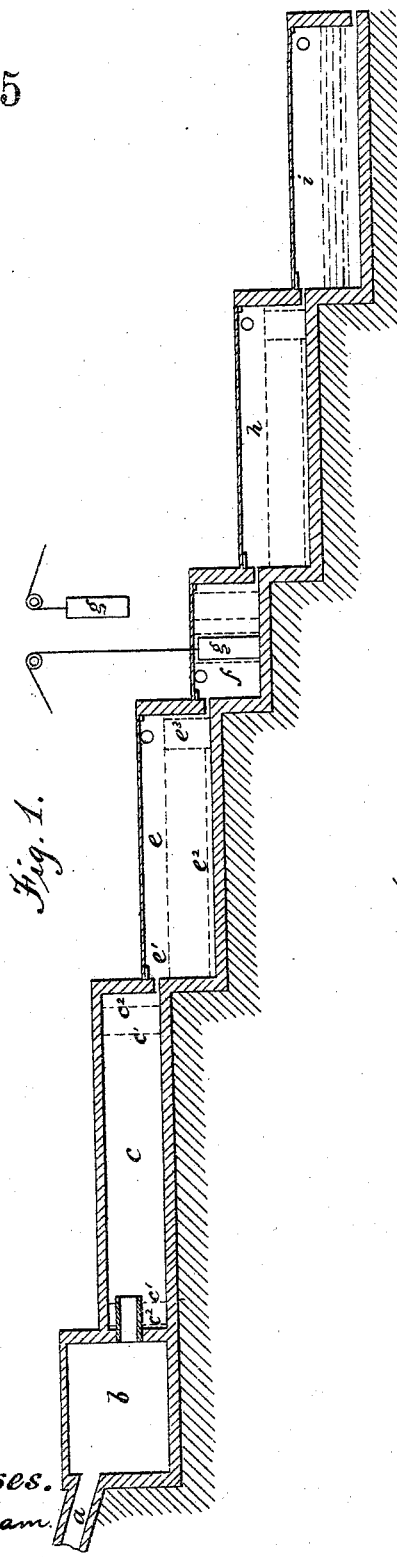
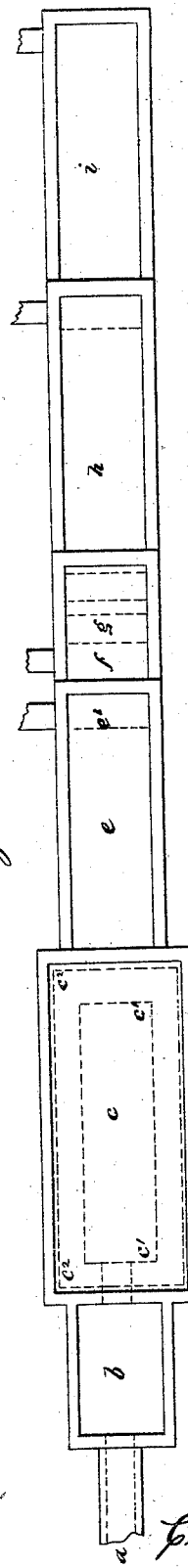
Witnesses.
M. W. Frothingham.
G. B. Kidder.
Inventor.
Robert Weare.
By his Attys.
Crosby & Gould

UNITED STATES PATENT OFFICE.

ROBERT WEARE, OF NEWCASTLE-UNDER-LYME, ENGLAND.

IMPROVEMENT IN TREATING SEWAGE.

Specification forming part of Letters Patent No. 116,515, dated June 27, 1871.

*To all whom it may concern:*

Be it known that I, ROBERT WEARE, of Newcastle-under-Lyme, in the county of Stafford, England, sanitary contractor, a subject of the Queen of Great Britain, have invented or discovered new and useful Improvements in Apparatus for Receiving and Treating Sewage and other noxious matters; and I, the said ROBERT WEARE, do hereby declare the nature of the said invention, and in what manner the same is to be performed, to be particularly described and ascertained in and by the following statement thereof—that is to say:

The invention relates to improvements in treating sewage and other noxious and excrementitious matters for the purpose of separating the liquid and solid matters and effecting the deodorization of such matters and rendering them innocuous.

In practicing the invention I provide for the deposit of the liquid or semi-liquid matters in vessels or tanks surrounded by filtrates and deodorants, so that the solid matters are freed from the liquids and the latter are deodorized, and so that, as regards commodes, the escape of gases can only be through a medium which will render them innocuous, this being a principal aim in adapting the invention to the construction of commodes, while in constructing sewage-tanks my principal aim has been to render the liquid innocuous and retain the solid sewage for use as manure.

In order to free the sewage from foul matter, so as to render the liquid innocuous and obtain from the sewage a valuable manure, I cause the sewage discharged from the sewer, after it has passed through a catch-pit where stones and sand are deposited, to enter a double tank. The inner sides of the tank are perforated, and inclose and retain filtering materials. The liquid part of the sewage percolates through these materials from the interior of the tank to the outer unperforated walls or sides, and escapes into succeeding filtering vessels, and so to the out-fall, while the solid part of the sewage remains within the first tank. The filtering materials I employ are charcoal and washed cinders, the former being reduced to the size of swan-shot, or thereabout.

In the annexed drawing, Figure 1 is a section, and Fig. 2 a plan of a system of apparatus for receiving and treating sewage according to my invention and in the manner which I prefer.

$a$ is a main sewer, discharging into a catch-pit, $b$, and thence into the interior of the tank $c$, which I call the fecal tank. $c^1$ $c^1$ are perforated partitions, of iron or wood. They are formed in panels of convenient size, and fitted into and supported by columns. $c^2$ $c^2$ are similar partitions, set at a distance of, say three feet, outside the partitions $c^1$, and the space between the two is filled up with a mixture of charcoal and washed cinders. The cinders may be of a size to pass through a quarter-inch sieve, while, as before stated, the charcoal may be about the size of swan-shot. The tank $c$ and the catch-pit are arched over or otherwise closed at the top, so that in no case can they overflow, and man-holes are provided to enter them. When the sewage comes down with unusual rapidity it accumulates in the sewer until a head of some feet is attained, and this pressure hastens the passage of the liquid through the filtering material contained between the partitions $c^1$ and $c^2$. The liquid from the tank $c$ passes into a tank, $e$. It flows onto a perforated metal plate, $e^1$, and falls as a shower onto a bed of cinders and charcoal supported on another perforated plate, $e^2$. The liquid filters through this bed and flows through another layer of filtering material, sustained by perforated plates $e^3$, into the trough $f$, where it meets the charcoal-box $g$, through which, also, it has to pass. The box fits into a recess formed for it in the brick-work. It is perforated at the front and back, and is filled with granulated charcoal and fine-washed cinders. Two of these boxes are provided, and they are used alternately, each for about twenty-four hours, and when out of use they are raised by a crane and kept suspended, so that they may drain and be purified by exposure to the air. $h$ is a tank, in all respects similar to the tank $c$. The ashes employed in it, however, should be finer. $i$ is another tank, which receives the liquid after passing the tank $h$. It contains several layers of charcoal and cinders, separated by perforated plates. The cinders in this tank should be as small as the charcoal, and a cloth is laid on the lowest plate to prevent the passage of the filtering material through the perforations. The liquid from the tank $h$ is sufficiently pure to be allowed to escape without injury or nuisance into any river or stream. The filtering materials are changed from time to time, as may be necessary. The later tanks are replenished more frequently than the earlier, and any of the filtering material which is not sufficiently charged with fertilizing material to be at once sold as manure is placed in the fecal tank to there mix with solid materials retained from the sewage. The fecal tank is emptied from time to time when it becomes full, and its contents sold as manure. The sewage-works are provided with two sets of apparatus, so that the sewage may be shut off from one set when it is requisite to empty any of the tanks. The size of the tanks will vary with the quantity of sewage to be dealt with.

The drawing is to the scale of one-eighth of an inch to a foot, and an arrangement of this size is suitable for from one thousand to one thousand five hundred persons.

All the tanks may advantageously be covered, and overflows may be provided to all the tanks beyond the fecal tank, to provide for exceptional cases, in which the subsequent filtrations may not proceed with sufficient rapidity. The waste waters from manufactories, where they are of a noxious nature, may be treated in this manner.

I claim—

A system or series of tanks, constructed and relatively arranged substantially as shown and described.

ROBERT WEARE.

Witnesses:
  MATT. F. BLAKISTON,
  JOB. HANLEY, *Staffordshire*,
  FREDK. G. LESTER, *Clerk to Messrs. Blakiston & Everett, Solrs., Shelton, Staffordshire.*